United States Patent
Kim et al.

(10) Patent No.: US 7,390,547 B2
(45) Date of Patent: Jun. 24, 2008

(54) SUPER RESOLUTION INFORMATION STORAGE MEDIUM

(75) Inventors: Hyun-ki Kim, Hwaseong-si (KR); Joo-ho Kim, Yongin-si (KR); In-oh Hwang, Seongnam-si (KR); Du-seop Yoon, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 408 days.

(21) Appl. No.: 10/999,200

(22) Filed: Nov. 30, 2004

(65) Prior Publication Data

US 2005/0153108 A1 Jul. 14, 2005

(30) Foreign Application Priority Data

Dec. 2, 2003 (KR) .................. 10-2003-0086744

(51) Int. Cl.
*B32B 3/02* (2006.01)
(52) U.S. Cl. ............. 428/64.1; 428/64.4; 428/64.5; 430/270.13
(58) Field of Classification Search ............. 428/64.1, 428/64.4, 64.5; 430/270.13
See application file for complete search history.

(56) References Cited

U.S. PATENT DOCUMENTS

| | | | |
|---|---|---|---|
| 6,358,589 B1 | 3/2002 | Tsai et al. | |
| 6,385,162 B1 * | 5/2002 | Nagase et al. | 369/288 |
| 6,410,115 B1 | 6/2002 | Tsai et al. | |
| 6,741,549 B2 * | 5/2004 | Tominaga et al. | 369/285 |
| 6,848,115 B2 * | 1/2005 | Sugiura et al. | 720/719 |
| 6,961,300 B2 * | 11/2005 | Cheong et al. | 369/275.1 |
| 7,166,346 B2 * | 1/2007 | Kim et al. | 428/64.4 |
| 7,172,798 B2 * | 2/2007 | Hwang et al. | 428/64.4 |
| 2003/0002428 A1 | 1/2003 | Cheong et al. | |
| 2004/0257968 A1 * | 12/2004 | Kim et al. | 369/275.2 |
| 2005/0170133 A1 * | 8/2005 | Ahn et al. | 428/64.4 |
| 2005/0249065 A1 * | 11/2005 | Kim et al. | 369/47.1 |

FOREIGN PATENT DOCUMENTS

| | | |
|---|---|---|
| KR | 1999-0086849 | 12/1999 |
| KR | 2003-0002590 | 1/2003 |

OTHER PUBLICATIONS

Office Action issued on Oct. 12, 2007 by the Chinese Intellectual Property Office for Chinese Patent Application No. 200480035523.4.

* cited by examiner

*Primary Examiner*—Elizabeth Mulvaney
(74) *Attorney, Agent, or Firm*—Stein, McEwen & Bui, LLP (57) ABSTRACT

A super resolution information storage medium includes: a substrate; a first super resolution layer which is formed over the substrate; a second super resolution layer which is formed over the first super resolution layer; and an insertion layer which is disposed between the first and second super resolution layers.

20 Claims, 10 Drawing Sheets

SUPER RESOLUTION INFORMATION STORAGE MEDIUM

CROSS-REFERENCE TO RELATED APPLICATIONS

This application claims the priority of Korean Patent Application No. 2003-86744, filed on Dec. 2, 2003, in the Korean Intellectual Property Office, the disclosure of which is incorporated herein in its entirety by reference.

BACKGROUND OF THE INVENTION

1. Field of the Invention

The present invention relates to a super resolution information storage medium, and more particularly, to an information storage medium that includes a recording mark of smaller magnitude than a resolving power of a reproduction beam in which information is recorded and from which information is reproduced and that has an improved carrier-to-noise ratio (C/N) and improved stability of signal reproduction.

2. Description of the Related Art

Optical recording media are used as information storage media with respect to which an optical pickup unit records and/or reproduces information in a non-contact way. Due to industrial development, the information storage media require a higher recording density. For this purpose, optical recording media, which have recording marks of a smaller magnitude than a resolving power of a laser beam so as to produce a super resolution phenomenon, have been developed.

When a wavelength of a light source for reproducing information from a recording medium is $\lambda$ and a numerical aperture of an objective lens is NA, $\lambda/4NA$ is generally a reproduction resolving limit. In other words, since a beam irradiated from a light source cannot distinguish a recording mark of a smaller magnitude than $\lambda/4NA$, information reproduction is generally impossible.

However, a super resolution phenomenon may occur, i.e., information may be reproduced from a recording mark of a larger magnitude than the reproduction resolving limit. Thus, the analysis of causes of and research and development on such a super resolution phenomenon are in progress. According to the super resolution phenomenon, it is possible for information to be reproduced from the recording mark of a larger magnitude than the reproduction resolving limit. Thus, a super resolution recording medium may substantially satisfy the demands for high density and large capacity.

To commonly use such a super resolution recording medium, the super resolution recording medium must meet basic recording and reproduction characteristics. Of the recording and reproduction characteristics, a C/N and the stability of signal reproduction are important. In particular, compared to a general information storage medium, a super resolution information storage medium uses recording and reproduction beams having relatively high powers. Thus, the realization of such a C/N and the stability of the C/N is a major task for the super resolution recording medium.

SUMMARY OF THE INVENTION

The present invention provides an information storage medium in which a C/N may be improved and a recording mark may be prevented from being deformed due to reiterative reproduction so as to increase reproduction stability and reliability.

According to an aspect of the present invention, an information storage medium may be utilized to record information or to reproduce information from a recording mark of a smaller magnitude than a resolving power of an incident beam. The information storage medium includes: a substrate; a first super resolution layer which is formed over the substrate; a second super resolution layer which is formed over the first super resolution layer; and an insertion layer which is disposed between the first and second super resolution layers.

Generally, the insertion layer is formed of a dielectric material.

Typically, the insertion layer is formed of ZnS—$SiO_2$, $SiO_x$, $SiN_x$, $AlO_x$, or $AlN_x$, wherein x is a positive number.

Generally, the first and second super resolution layers are formed of at least one of $PtO_x$, $AuO_x$, $PdO_x$, or $AgO_x$, wherein x is a positive number, or a high molecular weight polymer material.

The information storage medium further includes at least one heat absorption layer which absorbs heat of the incident beam.

According to another aspect of the present invention, an information storage medium may be utilized to record information or to reproduce information from a recording mark of a smaller magnitude than a resolving power of an incident beam. The information storage medium includes: a substrate; a first dielectric layer which is formed on the substrate; a first heat absorption layer which is formed on the first dielectric layer and deformed by the incident beam; a second dielectric layer which is formed on the first heat absorption layer; a first super resolution layer which is formed on the second dielectric layer and includes a portion onto which the incident beam is irradiated and an optical characteristic of which is changed so that a super resolution phenomenon occurs; a second super resolution layer which is formed on the first super resolution layer and includes a portion on which the incident beam is irradiated and an optical characteristic which is changed so that a super resolution phenomenon occurs; an insertion layer which is disposed between the first and second super resolution layers; and a third dielectric layer which is disposed over the second super resolution layer.

The information storage medium further includes: a second heat absorption layer which is formed on the third dielectric layer; and a fourth dielectric layer which is formed on the second heat absorption layer.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

An information storage medium, according to the present invention, refers to a super resolution information storage medium in which information may be recorded in and reproduced from a recording medium having a recording mark with a smaller magnitude than a resolving limit of an irradiating incident beam.

Figure 1:
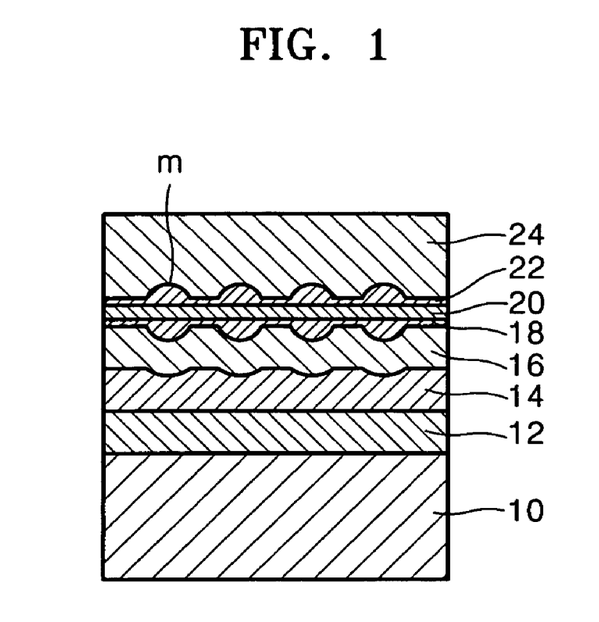
FIG. 1 is a cross-sectional view of an information storage medium according to an embodiment of the present invention.

Referring to FIG. 1, the information storage medium includes at least one heat absorption layer 14 which is thermally deformed by the irradiation of a recording or reproduction beam for the occurrence of a super resolution phenomenon and first and second super resolution layers 18 and 22. An insertion layer 20 is disposed between the first and second super resolution layers 18 and 22.

As shown in FIG. 1, an information storage medium, according to an embodiment of the present invention, includes a substrate 10, at least one heat absorption layer 14 which absorbs heat of a recording or reproduction beam and thus is deformed, the first and second super resolution layers 18 and 22, and the insertion layer 20 which is disposed between the first and second super resolution layers 18 and 20.

The substrate 10 is formed of polycarbonate, polymethylmethacrylate (PMMA), amorphous Polyolefin (APO), or a glass material.

Generally, the first and second super resolution layers 18 and 22 are formed of at least one of $PtO_x$, $PdO_x$, $AuO_x$, or $AgO_x$, wherein x is a positive number, or a high molecular weight polymer material. Here, the first and second resolution layers 18 and 22 absorb heat of the recording or reproduction beam, and thus, are deformed.

The insertion layer 20 serves to prevent the deformation of the first and second super resolution layers 18 and 22 and diffusion of same due to reiterative irradiation of the reproduction beam, and the insertion layer is generally formed of a dielectric material. For example, typically, the insertion layer 20 is formed of at least one of $ZnS$—$SiO_2$, $SiO_x$, $SiN_x$, $AlO_x$, and $AlN_x$, wherein x is a positive number.

Alternatively, the insertion layer 20 may typically be formed of a semiconductor material.

The heat absorption layer 14 may be disposed between the substrate 10 and the first super resolution layer 18 or may be disposed over the second super resolution layer 22. The heat absorption layer 14 may be formed of a Ge—Sb—Te-based alloy or an Ag—In—Sb—Te-based alloy. The heat absorption layer 14 is deformed by the reproduction beam so as to assist in deformation of the first and second super resolution layers 18 and 22. The recording and reproduction beams may be irradiated from below, or an opposite direction with respect to the substrate 10, toward the substrate 10.

The heat absorption layer 14 may be disposed under or over the first and second super resolution layers 18 and 22, but generally is disposed in a path of the recording or reproduction beam that is used to irradiate the super resolution layers 18 and 22.

A one-time functional operation of the information storage medium of an embodiment of the present embodiment will be explained. Here, a case wherein the first and second super resolution layers 18 and 22 are formed of platinum oxide ($PtO_x$, wherein x is a positive number) will be explained.

When a laser beam of recording power is irradiated onto the first and second super resolution layers 18 and 22, a region in which the laser beam is focused is deformed. When a laser beam having a temperature that is greater than a predetermined temperature is irradiated onto the first and second super resolution layers 18 and 22, platinum oxide ($PtO_x$, wherein x is a positive number) is decomposed into platinum and oxygen, and then the oxygen forms bubbles. Thus, a portion on which an optical spot is focused swells. The heat absorption layer 14 is deformed together with the deformation of the first and second super resolution layers 18 and 22. Such deformation results in forming a recording mark m. The recording mark m is not deformed by a reproduction beam having a lower power than a recording beam, but remains in its original shape.

The recording mark m may be formed by a phase change as well as by bubbling, as described above. In this case, the heat absorption layer 14 may be formed by a phase change of material such as a Ge—Sb—Te-based alloy or an Ag—In—Sb—Te-based alloy, and a portion of the heat absorption layer 14 onto which the recording beam has been irradiated is changed into an amorphous state so as to form the recording mark m. In a case where a recording mark is formed in the heat absorption layer 14, recording and erasing may be performed with respect to the information storage medium of an embodiment of the present embodiment.

The information storage medium according to the present invention may be a reproduction-only information storage medium. When the information storage medium of the present invention is the reproduction-only information storage medium, recording marks are formed on the substrate 10 in a pit form. When reproduction is performed with respect to the reproduction-only information storage medium, including the pits of a larger magnitude than the resolving limit, the heat absorption layer 14 and the first and second super resolution layers 18 and 22 are thermally deformed by the reproduction beam. As a result, a super resolution phenomenon occurs so as to realize reproduction of data.

A first dielectric layer 12 is formed between the substrate 10 and the heat absorption layer 14, a second dielectric layer 16 is formed between the heat absorption layer 14 and the first super resolution layer 18, and a third dielectric layer 24 is formed on the second super resolution layer 22.

Figure 2:
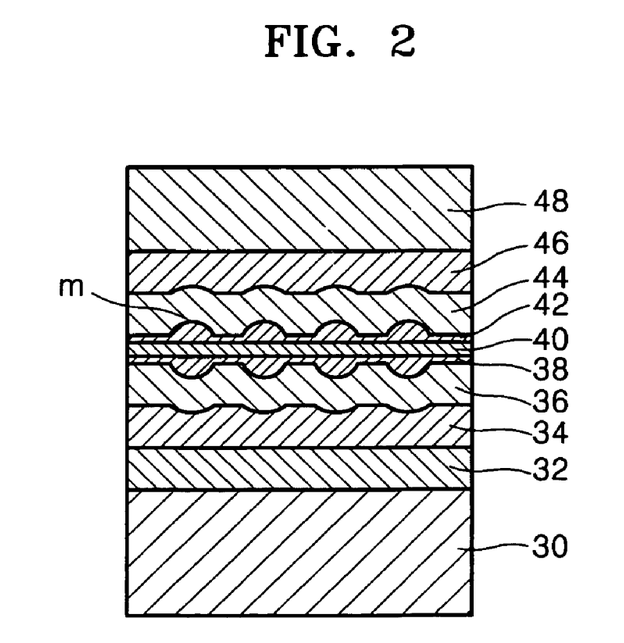
FIG. 2 is a cross-sectional view of an information storage medium according to another embodiment of the present invention.

An information storage medium according to another embodiment of the present invention will now be explained. Referring to FIG. 2, the information storage medium includes a substrate 30, first and second super resolution layers 38 and 42 which are formed over the substrate 30, an insertion layer 40 which is disposed between the first and second super resolution layers 38 and 42, and first and second heat absorption layers 34 and 46. In the embodiment of FIG. 2, a heat absorption layer includes two layers.

A first dielectric layer 32 is formed between the substrate 30 and the first heat absorption layer 34, a second dielectric layer 36 is formed between the first heat absorption layer 34 and the first super resolution layer 38, a third dielectric layer 44 is formed between the second super resolution layer 42 and the second heat absorption layer 46, and a fourth dielectric layer 48 is formed on the second heat absorption layer 46.

As described above, the information storage medium according to selected embodiments of the present invention is characterized in that the insertion layer 20 or 40 is disposed between the first and second super resolution layers 18 and 22 or 38 and 42.

The results, which were obtained from experiments on a C/N and deterioration characteristics caused by reiterative reproduction, will be compared for a case wherein the insertion layer 20 or 40 is provided and a case wherein the insertion layer 20 or 40 is not provided.

Figure 3A:
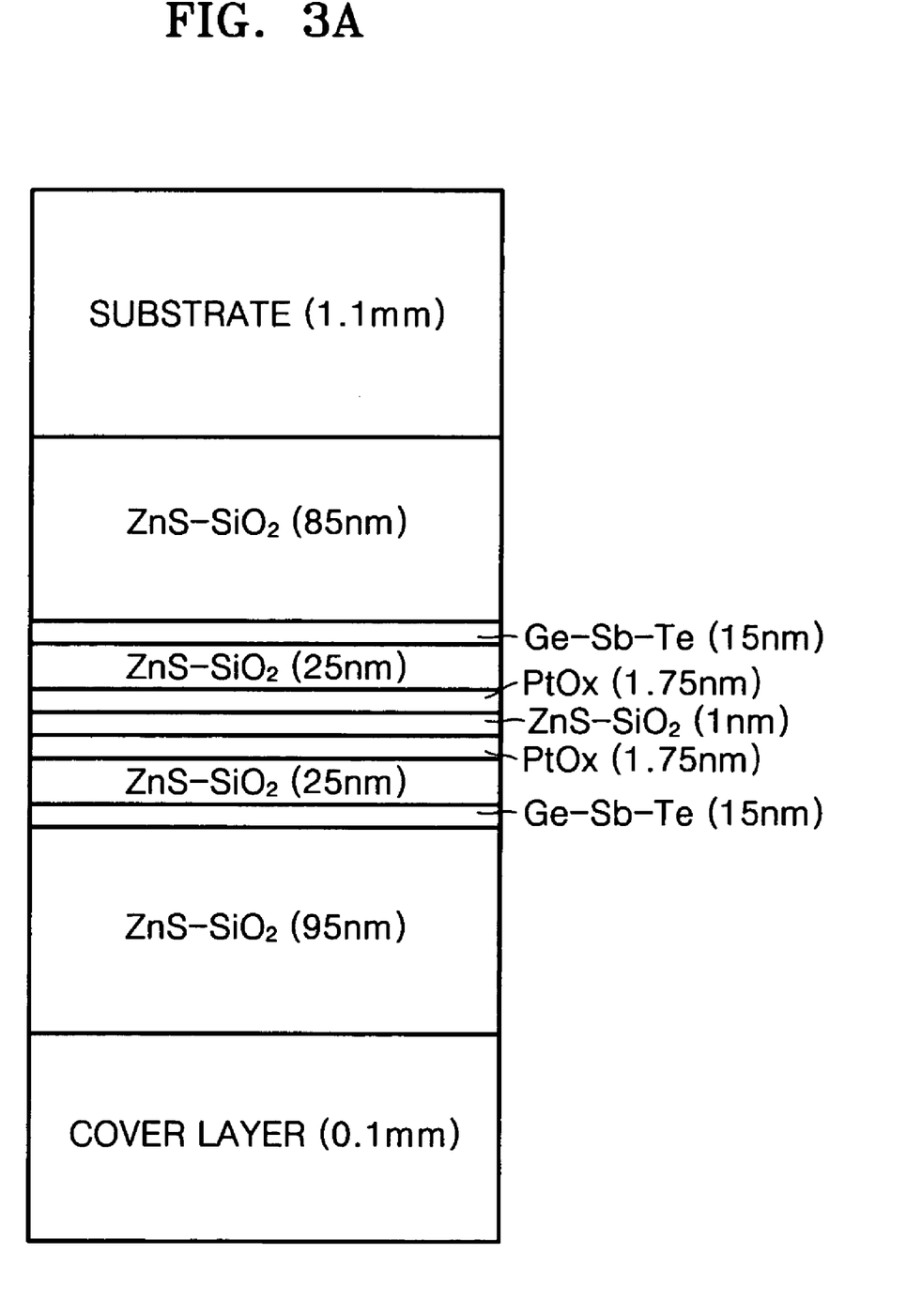
FIG. 3A is a cross-sectional view of an information storage medium according to an embodiment of the present invention, configured so as to measure a C/N and a stability of the C/N.

As shown in FIG. 3A, the information storage medium of the present invention, which was used to measure a C/N and a stability of the C/N, includes a substrate of 1.1 mm, a first dielectric layer ZnS—SiO$_2$ of 85 nm, a first heat absorption layer Ge—Sb—Te of 15 nm, a second dielectric layer ZnS—SiO$_2$ of 25 nm, a first super resolution layer PtO$_x$ of 1.75 nm (wherein x is a positive number), an insertion layer of 1 nm, a second super resolution layer PtO$_x$ of 1.75 nm (wherein x is a positive number), a third dielectric layer ZnS—SiO$_2$ of 25 nm, a second heat absorption layer Ge—Sb—Te of 15 nm, a fourth dielectric layer ZnS—SiO$_2$ of 95 nm, and a cover layer of 0.1 mm.

Figure 3B:
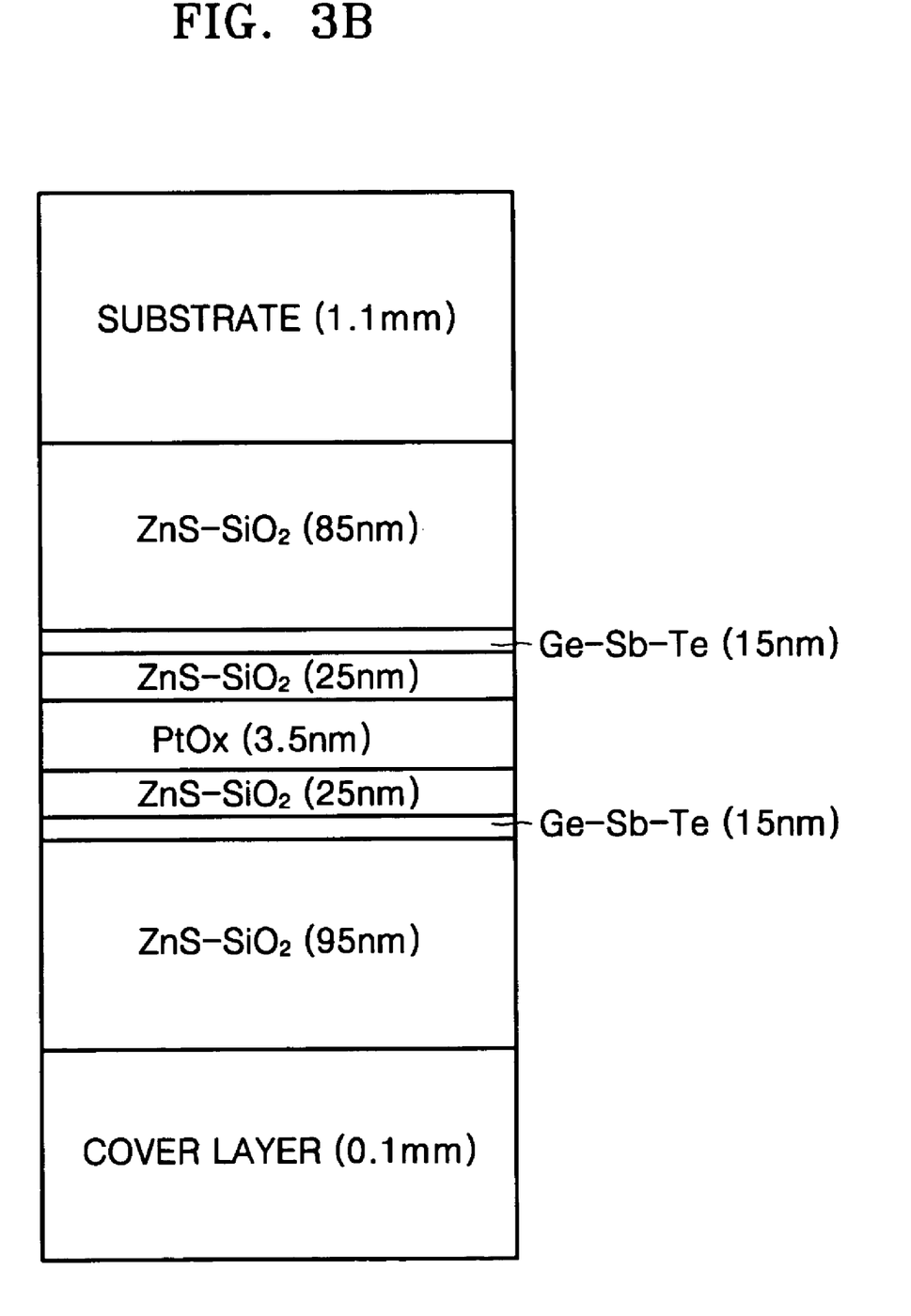
FIG. 3B is a cross-sectional view of an information storage medium which does not include an insertion layer, to provide a comparison with the C/N and the stability of the C/N of the information storage medium of an embodiment of the present invention.

As shown in FIG. 3B, a comparable information storage medium includes a substrate of 1.1 mm, a first dielectric layer ZnS—SiO$_2$ of 85 nm, a first heat absorption layer Ge—Sb—Te of 15 nm, a second dielectric layer ZnS—SiO$_2$ of 25 nm, a super resolution layer PtO$_x$ of 3.5 nm (wherein x is a positive number), a third dielectric layer ZnS—SiO$_2$ of 25 nm, a second heat absorption layer Ge—Sb—Te of 15 nm, a fourth dielectric layer ZnS—SiO$_2$ of 95 nm, and a cover layer of 0.1 mm.

Figure 4:
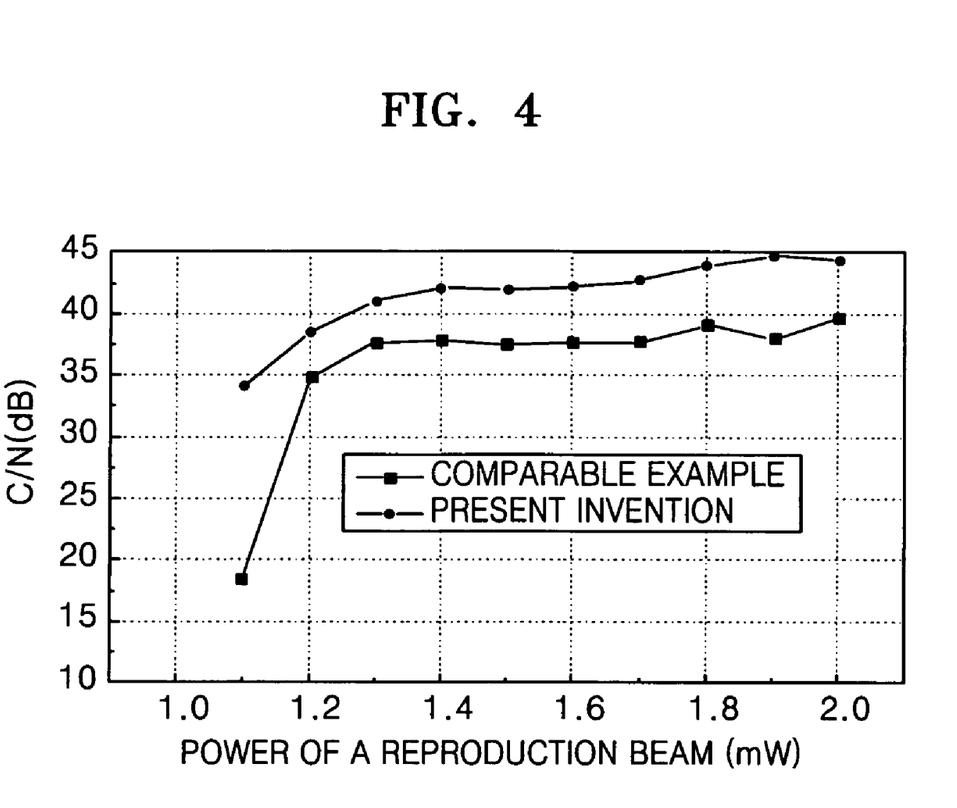
FIG. 4 is a graph to show a comparison between a variation of a C/N in the information storage medium of an embodiment of the present invention with respect to a power of a reproduction beam and a variation of a C/N in the information storage medium of FIG. 3B with respect to a power of a reproduction beam.

FIG. 4 is a graph to illustrate a comparison between a variation of a C/N with respect to a reproduction power when information is reproduced from a mark of 75 nm of the information storage medium of an embodiment of the present invention (refer to FIG. 3A) and a variation of a C/N with respect to the reproduction power when information is reproduced from a mark of 75 nm of an information storage medium which does not include an insertion layer (refer to FIG. 3B). As may be seen in FIG. 4, the C/N of the information storage medium which does not include an insertion layer is lower than the C/N of the information storage medium of an embodiment of the present invention including an insertion layer. When reproduction is performed with respect to the information storage medium that does not include the insertion layer by changing a reproduction power of the reproduction beam into 1.0 to 2.0 mW, the C/N of the information storage medium that does not include the insertion layer does not reach a minimum C/N value of 40 dB, which is required for data reproduction.

In contrast, the C/N of the information storage medium of the embodiment of the present invention has a value that is greater than the minimum C/N value of 40 dB at the reproduction power of about more than 1.3 mW. According to the results of the experiments, the insertion layer of the embodiment of the present invention contributes to improving the C/N.

Figure 5A:
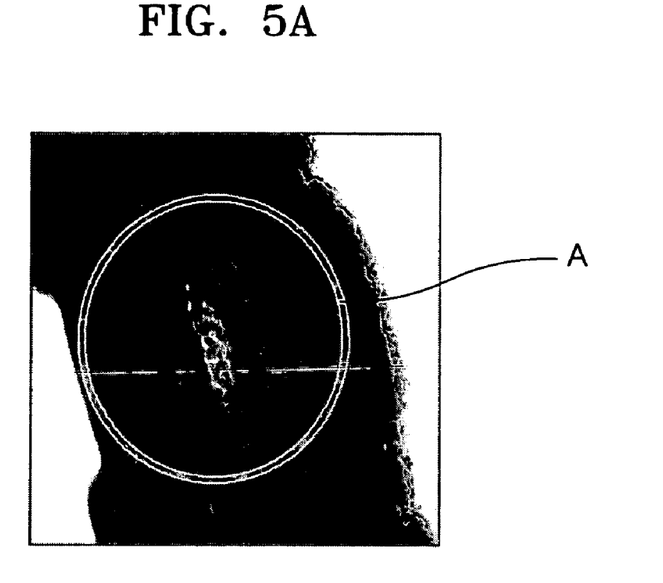
FIG. 5A is a Transmission Electric Microscope (TEM) photo to show a recording mark formed in the information storage medium of an embodiment of the present invention.
Figure 5B:
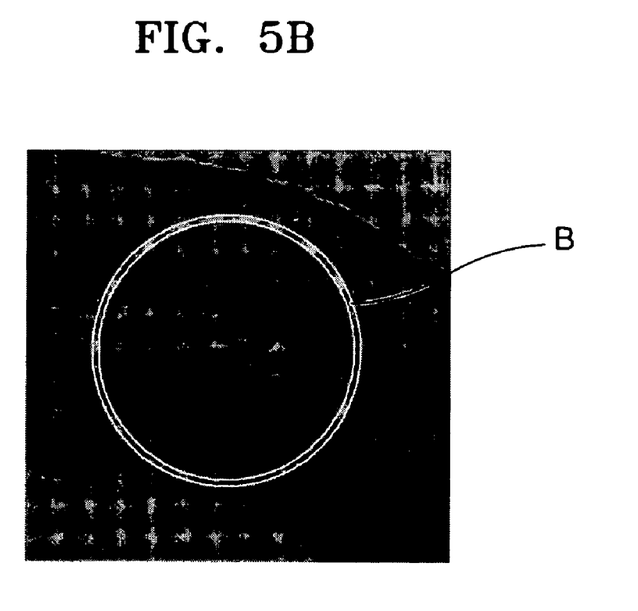
FIG. 5B is a TEM photo to show a recording mark formed in the information storage medium of FIG. 3B.

FIG. 5A is a TEM photo illustrating the shape of a recording mark (marked with circle A) formed in the information storage medium of the embodiment of the present invention that includes the insertion layer. FIG. 5B is a TEM photo illustrating the shape of a recording mark (marked with circle B) formed in the information storage medium that does not include the insertion layer.

Referring to FIGS. 5A and 5B, the recording mark formed in the information storage medium of the present invention is much more distinct than the recording mark formed in the information storage medium that does not include the insertion layer. Even in the TEM photos, the C/N value of the information storage medium of the embodiment of the present invention appears to be superior to the C/N value of the information storage medium that does not include the insertion layer.

Figure 6A:
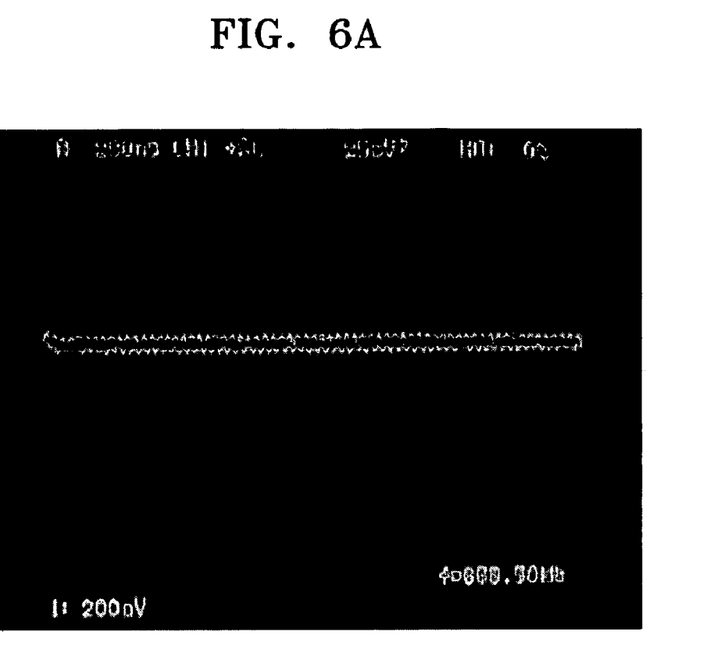
FIG. 6A is a view to show a radio frequency (RF) signal for the information storage medium of an embodiment of the present invention.
Figure 6B:
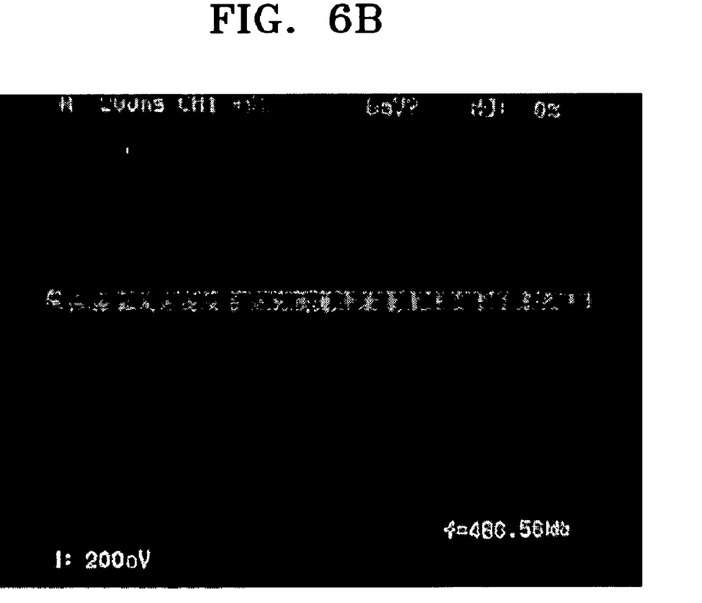
FIG. 6B is a view to show an RF signal for the information storage medium of FIG. 3B.

FIG. 6A is a view illustrating an RF signal for the information storage medium of an embodiment of the present invention, and FIG. 6B is a view illustrating an RF signal for the information storage medium which does not include the insertion layer.

Referring to FIGS. 6A and 6B, the RF signal for the information storage medium in which the insertion layer is disposed between the first and second super resolution layers is more distinct than the RF signal of the information storage medium which does not include the insertion layer.

Figure 7:
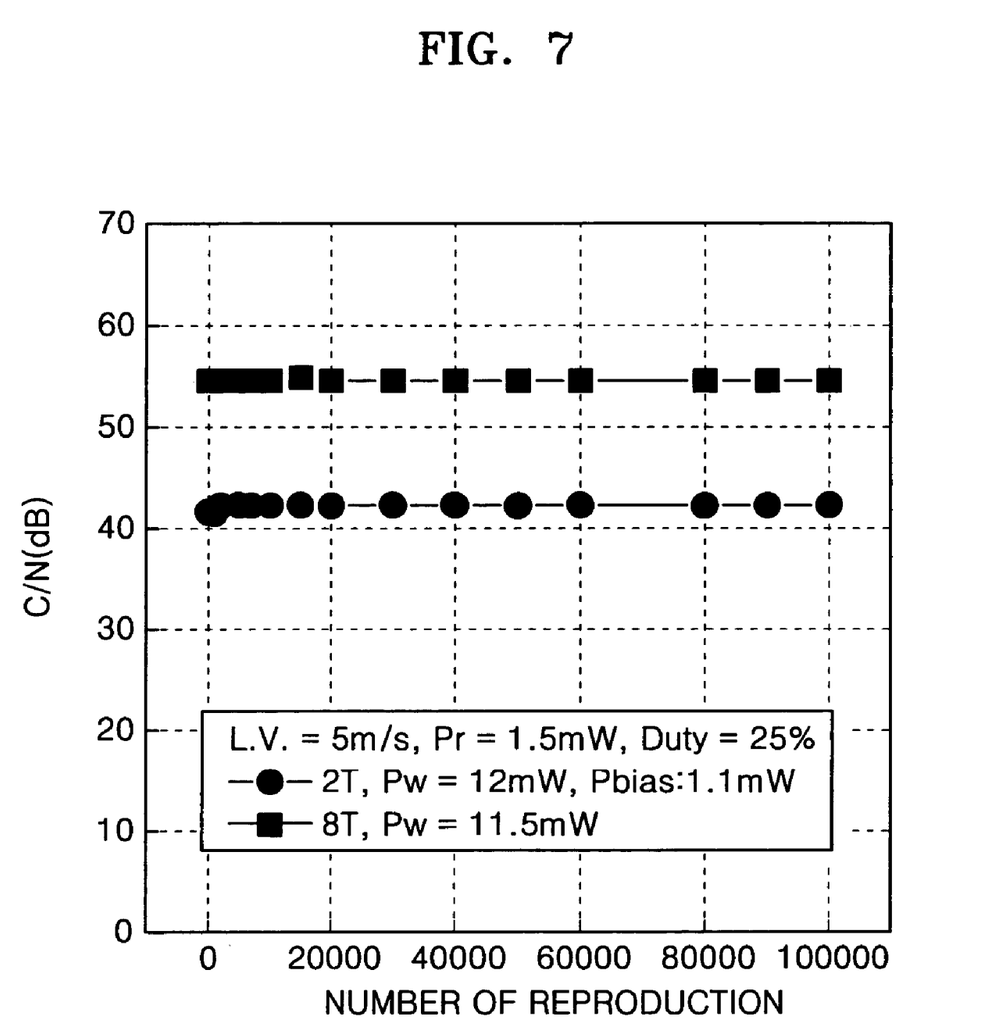
FIG. 7 is a graph to show variations of a C/N in 2T and 8T with respect to a number of times reproduction is performed with respect to the information storage medium of an embodiment of the present invention, i.e., when reproduction is repeated with respect to the information storage medium of an embodiment of the present invention a hundred thousand times.

Meanwhile, the stability of the information storage medium of embodiment of the present invention was measured. Here, the measurement of the stability of the C/N is obtained by checking the deterioration characteristics caused by reiterative reproduction performed with respect to the information storage medium. In other words, a C/N value and a variation of the C/N value are measured during several-time reiterative reproduction. FIG. 7 is a graph illustrating variations of a C/N value in 2T and 8T with respect to a number of times reproduction is performed with respect to the information storage medium of an embodiment of the present invention, i.e., when reproduction is repeated with respect to an embodiment of the information storage medium of the present invention a hundred thousand times. Here, when the information storage medium was rotated at speed z of 5 m/sec, a recording power was set to 12 mW and 11.5 mW for 2T and 8T, respectively, and the reproduction power was set to 1.5 mW, the C/N value was measured.

According to the measurement results, the C/N value substantially does not vary even when reproduction is repeated with respect to the information storage medium a hundred thousand times. Although the C/N value is within a reproducible range at an initial use stage of the information storage medium, the C/N value may decrease with reiterative reproduction. This makes it impossible to make regular use of such information storage media.

Figure 8:
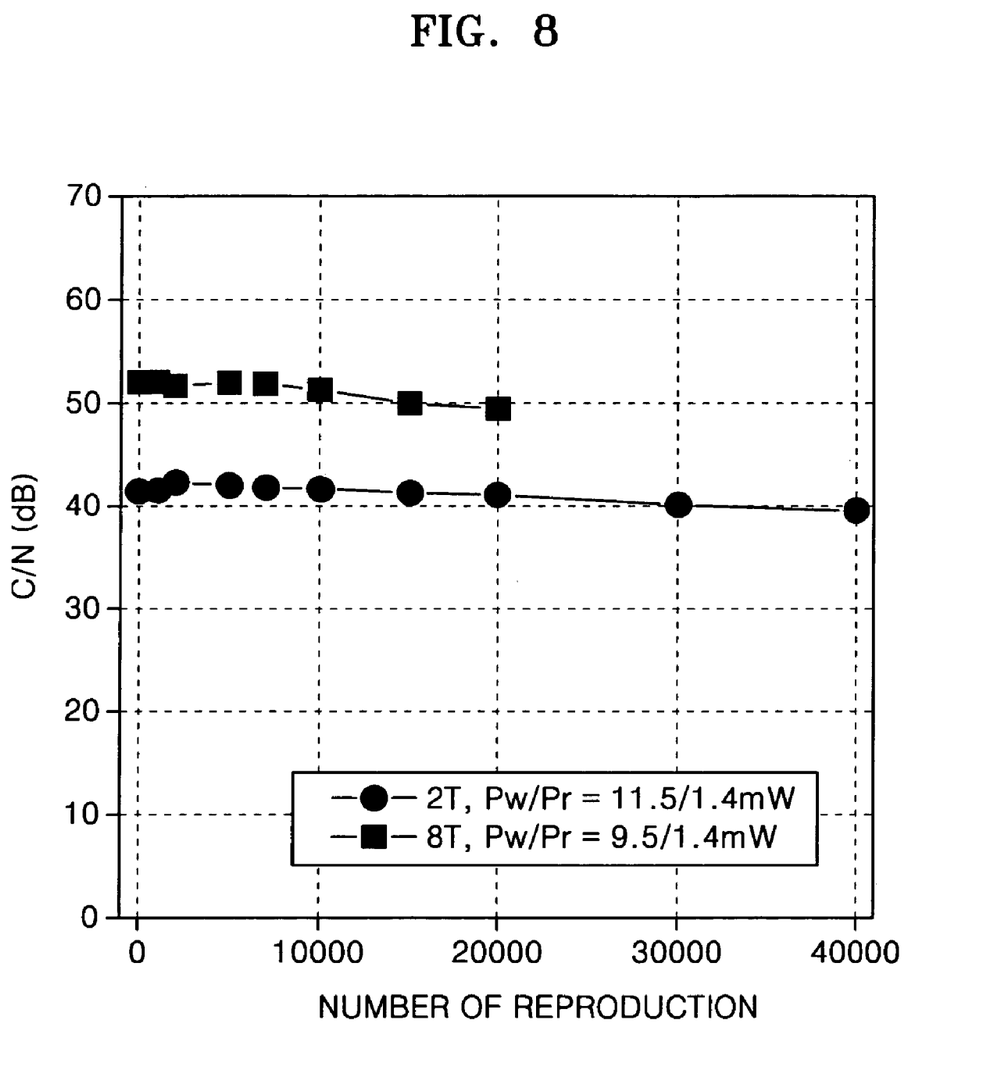
FIG. 8 is a graph to show variations of a C/N in 2T and 8T with respect to the number of times reproduction is performed with respect to the information storage medium of FIG. 3B.

FIG. 8 is a graph for showing variations of a C/N value in 2T and 8T with respect to a number of times reproduction is performed with respect to the information storage medium that does not include the insertion layer. As may be seen in FIG. 8, as a reproduction beam is reiteratively irradiated, the C/N value deteriorates quickly. Here, in a case of 8T, the C/N value decreases from 52.5 dB to 49.5 dB when reproduction is performed twenty thousand times. In a case of 2T, the C/N value deceases from 42 dB to 39.5 dB when reproduction is performed forty thousand times.

Figure 9:
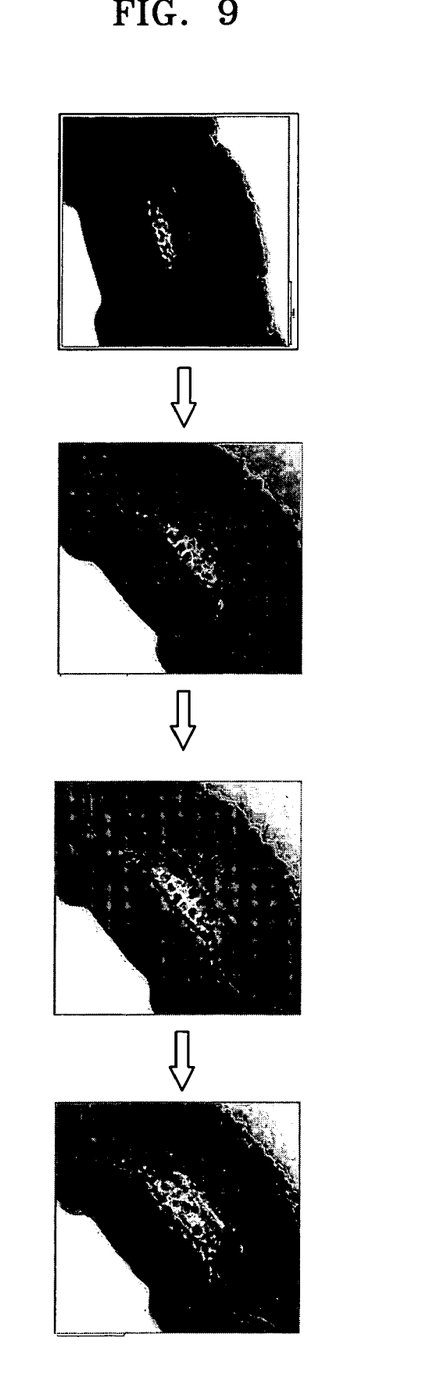
FIG. 9 is a view illustrating the principle of preventing a recording mark from deteriorating due to reiterative reproduction by using an insertion layer of the information storage medium of an embodiment of the present invention.

FIG. 9 is a TEM photo illustrating a process of signal deterioration during 100-time reproduction at a reproduction power of 3.5 mW. Since a reproduction power of a reproduction beam is set to 1.2 mW to 1.3 mW during reproduction with respect to the super resolution information storage medium of an embodiment of the present invention, the reproduction power of 3.5 mW is too high. Even though a hundred-thousand-time reproduction is performed with respect to the information storage medium of the embodiment of the present invention, the information storage medium of the embodiment of the present invention does not deteriorate. However, deterioration of an embodiment of the information storage medium of the present invention was induced through reiterative reproduction at a higher reproduction power than a normal reproduction power in order to observe how the insertion layer prevents the information storage medium from deteriorating.

Referring to FIG. 9, during reiterative reproduction, oxygen $O_2$ inside a recording mark continues expanding and diffusing into a heat absorption layer. Thus, the recording mark becomes indistinct, and the information storage medium deteriorates. At an initial reproduction stage, the C/N value was 43 dB. However, the C/N value decreased to 33 dB after a 100-time reproduction at the reproduction power of 3.5 mW. In consideration of this phenomenon, the insertion layer according to an embodiment of the present invention serves to prevent a thermal reaction in a metal oxide layer from being diffused to a neighboring heat absorption layer during reiterative reproduction.

Referring to FIGS. 1 and 2, in a recording and/or reproduction method with respect to the information storage medium of an embodiment of the present invention, a recording beam having a temperature that is greater than a predetermined temperature is irradiated onto the first and second super resolution layers 18 and 22 or 38 and 42 so as to expand the first and second super resolution layers 18 and 22 or 38 and 42. As a result, a recording mark has a smaller magnitude than a resolving power, and plasmon is generated in the first and second super resolution layers 18 and 22 or 38 and 42. Here, the expansion of the first and second super resolution layers 18 and 22 or 38 and 42 causes the heat absorption layer 14 or 36 and 46 to be deformed. Thereafter, a reproduction beam is irradiated onto the first and second super resolution layers 18 and 22 or 38 and 42 to excite the plasmon. As a result, the recording mark is reproduced.

When a reproduction beam is irradiated to reproduce information from an information storage medium, the insertion layer 20 or 40 between the first and second super resolution layers 18 and 22 or 38 and 42 prevents a thermal reaction of the first and second super resolution layers 18 and 22 or 38 and 42 from being diffused into a neighboring layer. As a result, the deterioration of the information storage medium caused by reiterative reproduction may be efficiently prevented.

Figure 10:
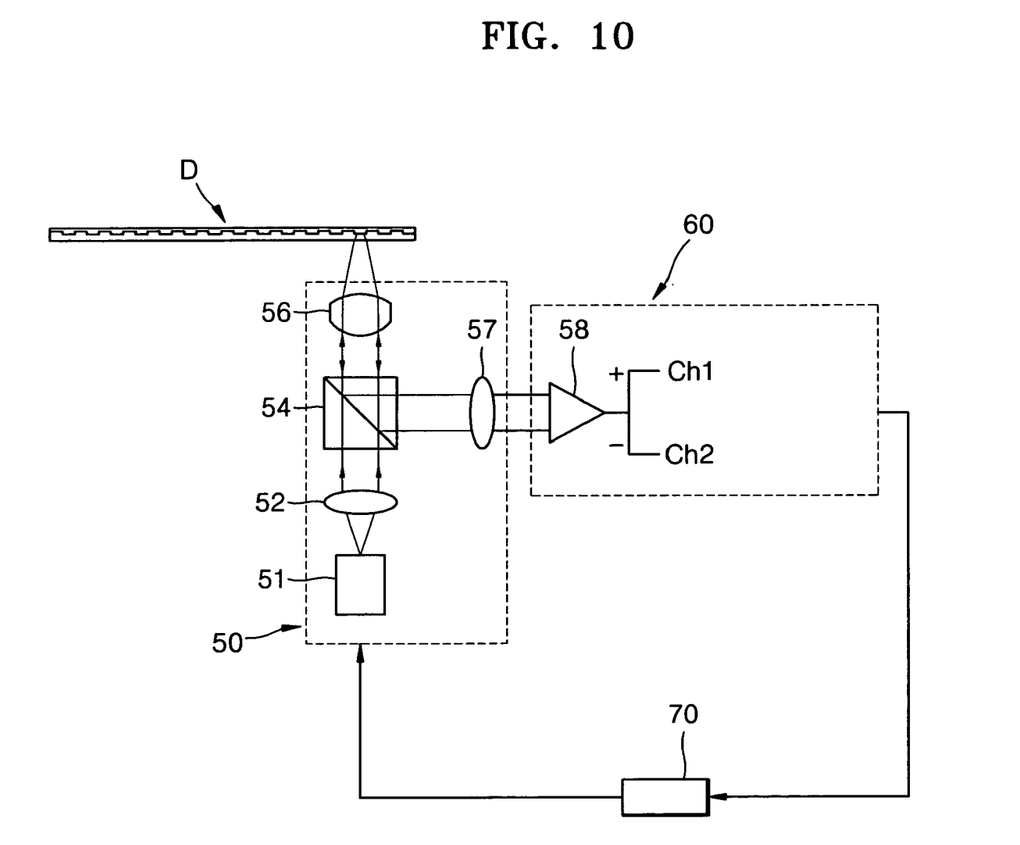
FIG. 10 is a schematic view illustrating a recording and/or reproduction system to perform recording and/or reproduction with respect to the information storage medium of an embodiment of the present invention.

FIG. 10 is a schematic view illustrating a recording and/or reproduction system to perform recording and/or reproduction with respect to the information storage medium of an embodiment of the present invention.

The recording and/or reproduction system includes a pickup unit 50, a recording and/or reproduction signal processor 60, and a controller 70. In more detail, the recording and/or reproduction system includes a laser diode 51 which irradiates a laser beam, a collimating lens 52 which makes the laser beam irradiated from the laser diode 51 parallel, a beam splitter 54 which changes a path through which the incident laser beam advances, and an objective lens 56 which condenses the laser beam having passed through the beam splitter 54 on an information storage medium D.

The laser beam is reflected from the information storage medium D. Next, the laser beam is reflected from the beam splitter 54 toward a photodetector, for example, a quadrant photodetector 57. An operation circuit 58 receives the laser beam from the quadrant photodetector 57, converts the laser beam into an electric signal, and outputs the electric signal via channel 1 Ch1 and channel 2 so that an RF signal, i.e., a sum signal, is detected through channel 1 and a differential signal is detected through channel 2 using a push-pull method.

The controller 70 controls the pickup unit 50 to irradiate a recording beam having more than a predetermined power suitable for the characteristic of a material of the information storage medium D, so as to form a recording mark of a smaller magnitude than the resolving power. The recording beam is used to record data on the information storage medium D. When a reproduction beam having a lower power than the recording beam is focused on the information storage medium D via the pickup unit 50, a super resolution phenomenon occurs on the information storage medium D. The super resolution phenomenon on the information storage medium D is the same as previously described and thus will not be explained in detail herein.

The reproduction beam is reflected from the information storage medium D toward the quadrant photodetector 57 through the objective lens 56 and the beam splitter 54. The operation circuit 58 receives the reproduction beam from the quarter photodetector 57, converts the reproduction beam into an electric signal, and outputs the electric signal as an RF signal. Since the RF signal appears clear as shown in FIG. 6A, information may be reproduced from the information storage medium D. A C/N value and stability of the information storage medium D may be improved by the insertion layer 20 or 40, and thus do not vary even during reiterative reproduction. Thus, the recording and/or reproduction signal processor 60 and the controller 70 may contribute to improving performing recording and/or reproduction of data.

As described above, in an information storage medium, according to the present invention, information may be reproduced from a recording mark of a smaller magnitude than a resolving power at a super resolution with the improvement of a C/N value and the prevention of the deterioration of the information storage medium caused by reiterative reproduction. Accordingly, a high recording density and a large capacity of the super resolution information storage medium may be realized.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An information storage medium in which information is recorded in or reproduced from a recording mark of a smaller magnitude than a resolving power of an incident beam, the information storage medium comprising:
    a substrate;
    a first super resolution layer formed over the substrate;
    a second super resolution layer formed over the first super resolution layer; and
    an insertion layer disposed between the first and second super resolution layers,
    wherein the first and second super resolution layers are a same type of super resolution layer, and the super resolution layers are disposed in direct contact with the insertion layer.

2. The information storage medium of claim 1, wherein the insertion layer is formed of a dielectric material.

3. The information storage medium of claim 2, wherein the insertion layer is formed of at least one of $ZnS\text{---}SiO_2$, $SiO_x$, $SiN_x$, $AlO_x$, or $AlN_x$, wherein x is a positive number.

4. The information storage medium of claim 1, wherein the first and second super resolution layers are formed of one of at least one of $PtO_x$, $AuO_x$, $PdO_x$, or $AgO_x$, wherein x is a positive number or a high molecular weight polymer.

5. The information storage medium of claim 1, further comprising at least one heat absorption layer which absorbs heat of the incident beam.

6. The information storage medium of claim 5, wherein the at least one heat absorption layer is disposed between the substrate and the first super resolution layer.

7. The information storage medium of claim 5, wherein the at least one heat absorption layer is disposed over the second super resolution layer.

8. The information storage medium of claim 5, wherein the at least one heat absorption layer is disposed in a path of a reproduction beam used to irradiate the first and second super resolution layers.

9. The information storage medium of claim 5, wherein a first dielectric layer is formed between the substrate and the at least one heat absorption layer and a second dielectric layer is formed on the second super resolution layer.

10. The information storage medium of claim 5, wherein the at least one heat absorption layer comprises first and second heat absorption layers.

11. The information storage medium of claim 10, wherein the first heat absorption layer is formed between the first super resolution layer and the substrate, and the second heat absorption layer is formed over the second super resolution layer.

12. The information storage medium of claim 1, wherein the insertion layer is formed of a semiconductor material.

13. An information storage medium in which information is recorded in or reproduced from a recording mark of a smaller magnitude than a resolving power of an incident beam, the information storage medium comprising:
    a substrate;
    a first dielectric layer which is formed on the substrate;
    a first heat absorption layer which is formed on the first dielectric layer and deformed by the incident beam;
    a second dielectric layer which is formed on the first heat absorption layer;
    a first super resolution layer which is formed on the second dielectric layer and that comprises a portion onto which the incident beam is irradiated and having a first optical characteristic that is changed so that a super resolution phenomenon occurs;
    a second super resolution layer which is formed on the first super resolution layer and that comprises a portion on which the incident beam is irradiated and has a second optical characteristic that is changed so that the super resolution phenomenon occurs;
    an insertion layer which is disposed between the first and second super resolution layers; and
    a third dielectric layer which is disposed over the second super resolution layer,
    wherein the first and second super resolution layers are a same type of super resolution layer.

14. The information storage medium of claim 13, further comprising:
    a second heat absorption layer formed on the third dielectric layer; and
    a fourth dielectric layer formed on the second heat absorption layer.

15. The information storage medium of claim 13, wherein the insertion layer is formed of a dielectric material.

16. The information storage medium of claim 13, wherein the insertion layer is formed of at least one of $ZnS\text{---}SiO_2$, $SiO_x$, $SiN_x$, $AlO_x$, or $AlN_x$, wherein x is a positive number.

17. The information storage medium of claim 13, wherein the first and second super resolution layers are formed of one of at least one of $PtO_x$, $AuO_x$, $PdO_x$, or $AgO_x$, wherein x is a positive number, or a high molecular weight polymer material.

18. The information storage medium of claim 13, wherein the insertion layer is formed of a semiconductor material.

19. A method of recording and/or reproducing data on/from an information storage in which information is recorded in or reproduced from a recording mark of a smaller magnitude than a resolving power of an irradiating incident beam, the method comprising:
    irradiating a laser beam of recording power and a temperature that is greater than a predetermined temperature onto first and second super resolution layers of the information storage medium to deform a region of the first and second super resolution layers in which the laser beam is focused, wherein the first and second resolution layers comprise $PtO_x$, $AuO_x$, $PdO_x$, or $AgO_x$, wherein x is a positive number, or a high molecular weight polymer; and
    deforming the region in which the laser beam is focused via bubbling of oxygen from decomposition of the $PtO_x$, $AuO_x$, $PdO_x$, or $AgO_x$, resulting in swelling of a portion of the region;
    wherein a heat absorption layer of the information storage medium is deformed together with the deformation of the region of the first and second super resolution layers to form the recording mark, and wherein the recording mark is not deformed by a reproduction beam having a lower power than a recording beam, the first and second super resolution layers are a same type of super resolution layer, and the super resolution layers are disposed in direct contact with the insertion layer.

20. A method of recording and/or reproducing data on/from an information storage in which information is recorded in or reproduced from a recording mark of a smaller magnitude than a resolving power of an irradiating incident beam, the method comprising:
    irradiating a laser beam of recording power and a temperature that is greater than a predetermined temperature onto first and second super resolution layers of the information storage medium to deform a region of the first and second super resolution layers in which the laser beam is focused, wherein the information storage medium includes at least one heat absorption layer that comprises a Ge—Sb—Te-based alloy or an Ag—In—Sb—Te-based alloy; and deforming the region in which the laser beam is focused via a phase change of the Ge—Sb—Te-based alloy or the Ag—In—Sb—Te-based alloy by changing a portion of the heat absorption layer onto which a recording beam has been irradiated into an amorphous state so as to form the recording mark, and wherein the recording mark is not deformed by a reproduction beam having a lower power than a recording beam, wherein the first and second super resolution layers are a same type of super resolution layer, and the super resolution layers are disposed in direct contact with the insertion layer.

* * * * *